(12) United States Patent
Chung

(10) Patent No.: US 9,132,711 B2
(45) Date of Patent: Sep. 15, 2015

(54) VEHICLE HAVING SHOCK ABSORBER MOUNTING ANGLE VARIATION STRUCTURE

(71) Applicant: Hyundai Motor Company, Seoul (KR)

(72) Inventor: Do Yeon Chung, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/310,728

(22) Filed: Jun. 20, 2014

(65) Prior Publication Data

US 2015/0165857 A1 Jun. 18, 2015

(30) Foreign Application Priority Data

Dec. 18, 2013 (KR) ........................ 10-2013-0158004

(51) Int. Cl.
*B60G 17/015* (2006.01)
*B60G 13/00* (2006.01)

(52) U.S. Cl.
CPC ............ *B60G 17/015* (2013.01); *B60G 13/005* (2013.01); *B60G 2204/129* (2013.01); *B60G 2204/4232* (2013.01)

(58) Field of Classification Search
CPC ........... B60G 13/005; B60G 2204/127; B60G 2204/129; B60G 2204/4232; B60G 17/00; B60G 17/015
See application file for complete search history.

(56) References Cited

U.S. PATENT DOCUMENTS

| 4,275,918 | A | * | 6/1981 | Franco ..................... 296/190.07 |
| 4,971,348 | A | * | 11/1990 | Oyama et al. .............. 280/5.521 |
| 5,109,939 | A | * | 5/1992 | Conaway et al. ........... 180/89.15 |
| 5,593,175 | A | * | 1/1997 | Oda et al. ...................... 104/281 |
| 5,636,857 | A | * | 6/1997 | Tandy et al. ............ 280/124.165 |
| 5,957,231 | A | * | 9/1999 | Conaway et al. ........... 180/89.14 |
| 2005/0242532 | A1 | * | 11/2005 | Deo et al. ........................ 280/5.5 |
| 2006/0001223 | A1 | * | 1/2006 | Krieger ........................ 280/6.15 |
| 2014/0156143 | A1 | * | 6/2014 | Evangelou et al. ............. 701/37 |

FOREIGN PATENT DOCUMENTS

| JP | 2006-342906 A | 12/2006 |
| JP | 4938823 B2 | 3/2012 |
| KR | 1020030033878 A | 5/2003 |
| KR | 10-2007-0009113 A | 1/2007 |
| KR | 10-2007-0107322 A | 11/2007 |
| KR | 1020090062243 A | 6/2009 |
| KR | 10-2012-0064539 A | 6/2012 |

* cited by examiner

*Primary Examiner* — Drew Brown
(74) *Attorney, Agent, or Firm* — Morgan, Lewis & Bockius LLP

(57) ABSTRACT

A vehicle having a shock absorber mounting angle variation structure may include a lower arm with a side rotatably disposed at a lower portion of a vehicle body, a shock absorber attenuating vibration due to vertical motion of the lower arm, wherein the shock absorber includes an upper end connected to an upper portion of the vehicle body, and a lower end coupled to an end of the lower arm, and a driving unit disposed on the lower arm and pushing or pulling the lower end of the shock absorber in a predetermined direction.

8 Claims, 2 Drawing Sheets

VEHICLE HAVING SHOCK ABSORBER MOUNTING ANGLE VARIATION STRUCTURE

CROSS-REFERENCE TO RELATED APPLICATION

The present application claims priority to Korean Patent Application No. 10-2013-0158004 filed on Dec. 18, 2013, the entire contents of which is incorporated herein for all purposes by this reference.

BACKGROUND OF THE INVENTION

1. Field of the Invention

The present invention relates to a vehicle having a shock absorber mounting angle variation structure that improves the function and efficiency of a shock absorber by varying the mounting angle of the shock absorber and more actively controls movement of a vehicle body.

2. Description of Related Art

In general, a suspension system, an important system for riding comfort and driving stability of a vehicle, at present, the main parts of the suspension system are a spring that absorbing shock due to bump/rebound of a wheel and a shock absorber that keeps a vehicle at a predetermined height while rapidly attenuating the vibration of the spring that absorbs shock and vibrates.

There are suspension systems with various structures, for example, a strut type in which a spring and a shock absorber are integrally formed and connected to a knuckle and a type in which they are installed at different positions.

Since the efficiency of shock absorbers depends on bump and rebound of a wheel, that is, the height of a vehicle body, it is required to optimize the mounting angle of the shock absorbers in accordance with the posture of a vehicle and movement of a wheel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle having a shock absorber mounting angle variation structure having advantages of improving the efficiency of a shock absorber by varying the mounting angle of the shock absorber in accordance with the height of a vehicle body.

In an aspect of the present invention, a vehicle having a shock absorber mounting angle variation structure may include a lower arm with a side rotatably disposed at a lower portion of a vehicle body, a shock absorber attenuating vibration due to vertical motion of the lower arm, wherein the shock absorber may include an upper end connected to an upper portion of the vehicle body, and a lower end coupled to an end of the lower arm, and a driving unit disposed on the lower arm and pushing or pulling the lower end of the shock absorber in a predetermined direction.

The driving unit may include a torque source generating a torque, a lead screw coupled to the torque source and rotated by the torque of the torque source, and a slider mounted on the lead screw and reciprocating along the lead screw.

The torque source is a motor and may include a screw fixing member rotatably fixing the lead screw and slidably mounting the slider thereon.

The vehicle may include a lever hinge rotatably fixed to the lower portion of the vehicle body, a lever disposed rotatably about the lever hinge, having a middle portion where a cam connected with the lower end of the shock absorber is formed, and a lever end where a slider groove in which the slider is inserted, the lever end being rotated about the lever hinge by the slider, and a fixing member fixing the cam of the lever and the lower end of the shock absorber.

The fixing member is a fixing bolt and fixes the cam to the lower end of the shock absorber.

The driving unit is fixed to a side of the lower arm through a mounting bracket.

The vehicle may further include a cam rail having a rail that is formed in the cam rail with a predetermined curvature and receives the cam to guide the cam rotating about the lever hinge along the rail.

The vehicle may further include a vehicle height sensor sensing a height of the vehicle body, and a controller controlling the driving unit in accordance with the height sent from the vehicle height sensor.

According to the present invention, by controlling the drive motor in response to a vehicle height signal from the vehicle height sensor, the slider is moved on the lead screw, the slider rotates the lever with a cam, and the cam connected to the lower end of the shock absorber moves along the rail formed along a predetermined curve, such that the mounting angle of the shock absorber can be effectively varied.

Accordingly, it is possible to effectively improve the efficiency of the shock absorber by varying the mounting angle of the shock absorber in accordance with the height of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
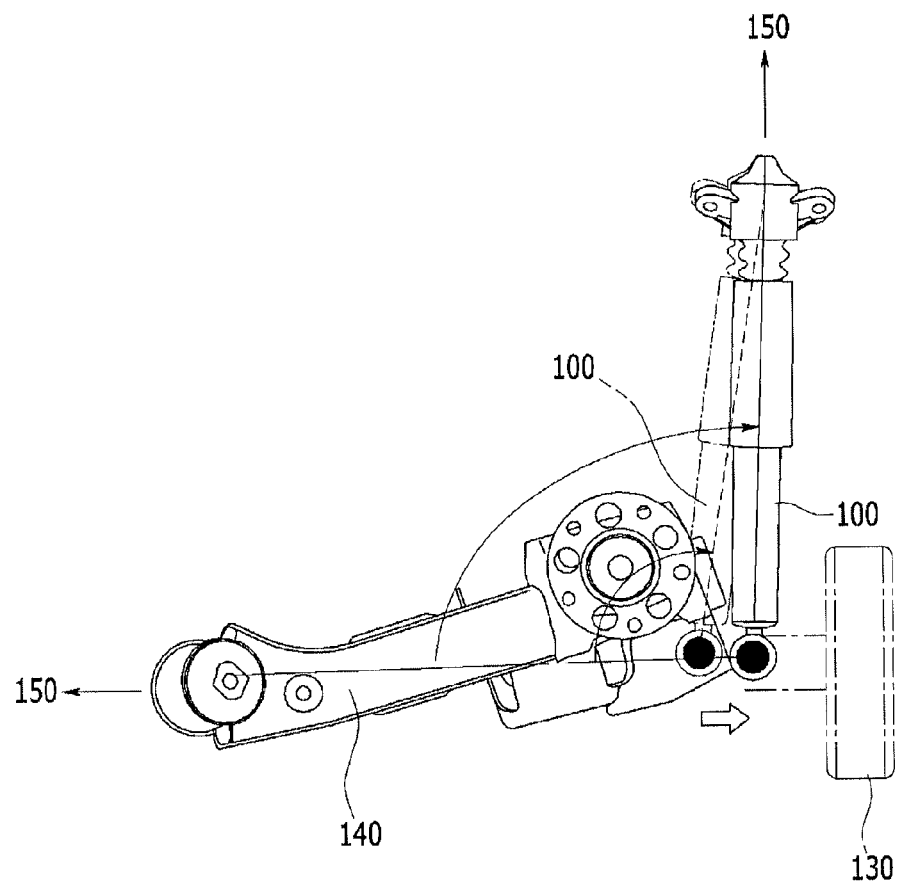
FIG. 1 is a schematic diagram of a vehicle having a shock absorber mounting angle variation structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a vehicle having a shock absorber mounting angle variation structure according to an exemplary embodiment of the present invention, in which the vehicle includes a vehicle body 150, a lower arm 140, a shock absorber 100, and a wheel 130.

Referring to FIG. 1, the end of the inner side of the lower arm 140 is rotatably connected to the lower portion of the vehicle body 150, the upper end of the shock absorber 100 is connected to the upper end of the vehicle body 150, the lower end of the shock absorber 100 is connected to the end of the outer side of the lower arm 140 by a hinge, and the wheel 130 is rotatably connected to the end of the outer side of the lower arm 140.

As the wheel 130 moves vertically with respect to the vehicle body, the end of the outer side of the lower arm 140 moves vertically with respect to the vehicle body 150 and the shock absorber 100 extends, such that shaking of the vehicle body 150 is reduced.

An exemplary embodiment of the present invention refers to the related art for an elastic member (suspension spring) elastically supporting the lower arm 140 and another structure are known in the art and does not provide the detailed description.

Further, in an exemplary embodiment of the present invention, the operation efficiency of the shock absorber 100 is improved in accordance with the posture of the vehicle and vertical movement of the wheel 130 by varying the position of the lower end of the shock absorber 100.

Figure 2:
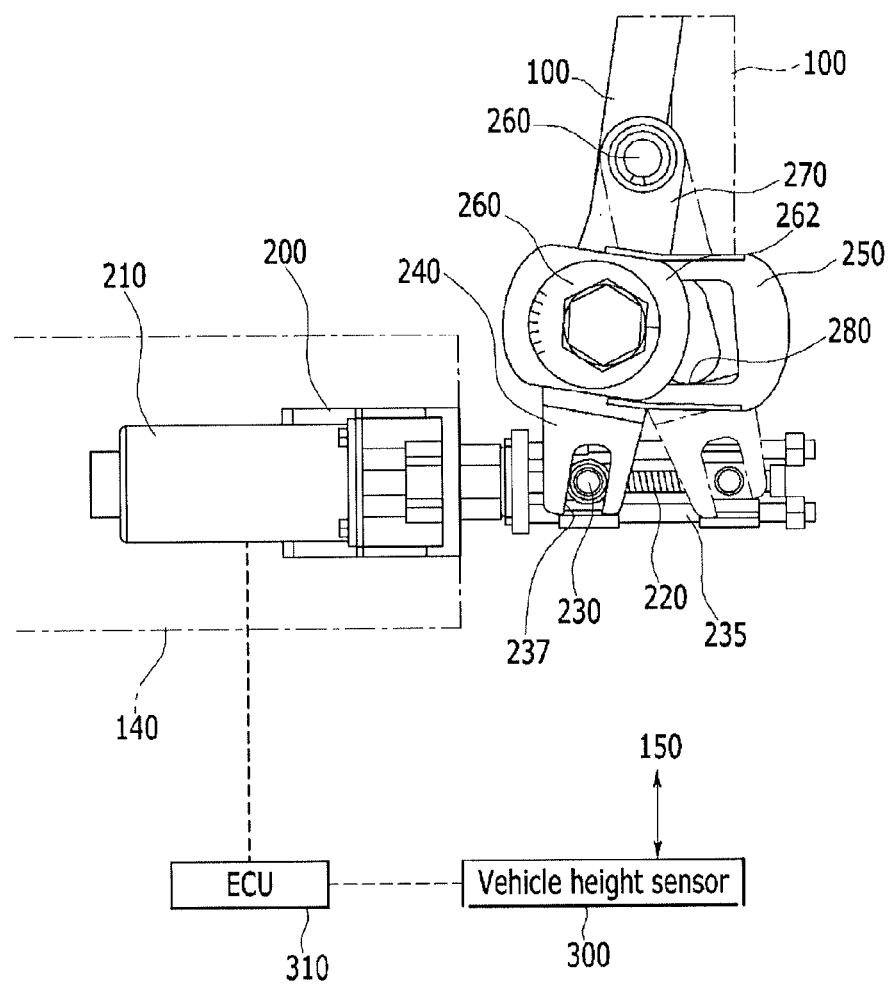
FIG. 2 is a side view showing in detail a portion of the vehicle having a shock absorber mounting angle variation structure according to an exemplary embodiment of the present invention.

FIG. 2 is a side view showing in detail a portion of the vehicle having a shock absorber mounting angle variation structure according to an exemplary embodiment of the present invention.

Referring to FIG. 1, the vehicle includes a lower arm 140, a drive motor 210, a mounting bracket 200, a lead screw 220, a slider 230, a screw fixing member 235, a lever 270, a cam 262, a lever end 240, a shock absorber fixing member 260, a lever hinge 260, a shock absorber 100, a cam rail 250, a rail 280, a vehicle height sensor 300, and a controller 310.

The drive motor 210, a torque source, is fixed to a side of the lower arm 140 through the mounting bracket 200 and the lead screw 220 is rotated by the drive motor 210.

The slider 230 that is reciprocated by the rotation of the lead screw 220 is disposed on the lead screw 220.

The lever hinge 260 is fixed to the vehicle body 150, at a position corresponding to the shock absorber 100, and the lever 270 is arranged downward to be rotatable about the lever hinge 260. The cam 262 is formed at the center of the lever 270 and a slider groove 237 is formed at the lever end 240 of the lever 270.

The cam 262 is fixed with the lower end of the shock absorber 100 by the fixing member 235 and the slider 230 is inserted in the slider groove 237 by the lever end 240. In an exemplary embodiment of the present invention, the fixing member 235 may be a fixing bolt.

The cam rail 250 is disposed on a side of the cam 262 to guide the cam 262 and the rail 280 that substantially guides the cam 262 is formed along a predetermined curve on the cam rail 250.

The vehicle height sensor 300 senses a height signal of the vehicle body 150 through a sensor and the controller 310 operates the drive motor 210 and rotates the lead screw 220 forward or backward in response to a height signal from the vehicle height sensor 300.

The lever 270 is rotated clockwise or counterclockwise about the hinge 260 by the rotation of the lead screw 220 and the cam rail 250 moves the cam 262 along a predetermined curve through the rail 280 having a predetermined curved shape.

Accordingly, since the cam 262 and the lower end of the shock absorber 100 are connected by the fixing member 235, the position of the lower end of the shock absorber 100 is variably controlled and the function and effect of the shock absorber 100 are optimally controlled in accordance with the height of the vehicle body 150.

An exemplary embodiment of the present invention refers to the related art for the structure and method of sensing the height of a vehicle by the vehicle height sensor are well known in the art and does not provide the detailed description.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle having a shock absorber mounting angle variation structure, comprising:
    a lower arm with a side rotatably disposed at a lower portion of a vehicle body;
    a shock absorber attenuating vibration due to vertical motion of the lower arm, wherein the shock absorber includes:
        an upper end connected to an upper portion of the vehicle body;
        a lower end coupled to an end of the lower arm; and
    a driving unit disposed on the lower arm and pushing or pulling the lower end of the shock absorber in a predetermined direction;
    a lever hinge rotatably fixed to the lower portion of the vehicle body;
    a lever disposed rotatably about the lever hinge, including a middle portion where a cam connected with the lower end of the shock absorber is formed; and
    a fixing member fixing the cam of the lever and the lower end of the shock absorber.

2. The vehicle of claim 1, wherein the driving unit includes:
    a torque source generating a torque;
    a lead screw coupled to the torque source and rotated by the torque of the torque source; and a slider mounted on the lead screw and reciprocating along the lead screw.

3. The vehicle of claim 2, wherein the toque source is a motor and includes a screw fixing member rotatably fixing the lead screw and slidably mounting the slider thereon.

4. The vehicle of claim 2,
wherein the lever further includes a lever end where a slider groove is positioned, the slider being inserted in the slider groove and the lever end being rotated about the lever hinge by the slider.

5. The vehicle of claim 1, wherein the fixing member is a fixing bolt and fixes the cam to the lower end of the shock absorber.

6. The vehicle of claim 1, wherein the driving unit is fixed to a side of the lower arm through a mounting bracket.

7. The vehicle of claim 1, further comprising a cam rail having a rail that is formed in the cam rail with a predetermined curvature and receives the cam to guide the cam rotating about the lever hinge along the rail.

8. The vehicle of claim 1, further comprising:
a vehicle height sensor sensing a height of the vehicle body; and
a controller controlling the driving unit in accordance with the height sent from the vehicle height sensor.

* * * * *